United States Patent
Sekiguchi (10) Patent No.: US 7,609,359 B2
(45) Date of Patent: Oct. 27, 2009

(54) METHOD OF MANUFACTURING LIQUID CRYSTAL PANEL

(75) Inventor: Kanetaka Sekiguchi, Nishitokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 448 days.

(21) Appl. No.: 11/434,794

(22) Filed: May 17, 2006

(65) Prior Publication Data
US 2006/0262267 A1    Nov. 23, 2006

(30) Foreign Application Priority Data
May 19, 2005  (JP) ............................. 2005-146456

(51) Int. Cl.
*G02F 1/1339* (2006.01)
(52) U.S. Cl. .................. 349/190; 349/153; 349/187
(58) Field of Classification Search ......... 349/153–154, 349/155–156, 187, 189–190
See application file for complete search history.

(56) References Cited

U.S. PATENT DOCUMENTS 6,705,584 B2 * 3/2004 Hiroshima et al. .......... 249/155
7,202,931 B2 * 4/2007 Chung et al. ................ 349/153

FOREIGN PATENT DOCUMENTS

JP        8-227276        9/1996

* cited by examiner

*Primary Examiner*—Dung T. Nguyen
(74) *Attorney, Agent, or Firm*—Westerman, Hattori, Daniels & Adrian, LLP.

(57) ABSTRACT

A plurality of projections are formed on one of a pair of substrates in a manner to surround a display area, thereafter a mask for shielding the outside of the display area on the substrate is placed such that the mask is in contact with the projections, and a deposition film is deposited within the display area with the mask being placed. After the mask is removed, a sealing material is placed in a region where the projections are formed. Then, another substrate of the pair of substrates is placed opposed to the one substrate having the projections formed thereon.

4 Claims, 11 Drawing Sheets

METHOD OF MANUFACTURING LIQUID CRYSTAL PANEL

BACKGROUND OF THE INVENTION

1. Field of the Invention

The present invention relates to a method of manufacturing a liquid crystal panel, in particular, a liquid crystal panel in which a deposition alignment film is placed.

2. Description of the Related Art

Conventionally, an alignment film of a liquid crystal display device is generally formed by the spin coating method using a resin such as polyimide or the like.

However, as the thickness of the liquid crystal layer is narrowed to about 1 μm because of demand for an increase in response speed or the like, the alignment film formed by the spin coating method is too thick, and there arises a problem of difficulty in making the film uniform in thickness.

To solve those problems, it is conceivable to form the alignment film by vapor deposition, but that deposition method also has a problem.

In general, as a method of manufacturing a liquid crystal panel, a method is conventionally employed in which a plurality of substrate for liquid crystal panels are formed in large substrates, and the large substrates are bonded together and cut into individual panels. When a deposition alignment film is formed as the alignment film, a mask having openings at portions corresponding to display areas of the individual liquid crystal panels is used to perform oblique deposition. The deposition is generally performed with the mask in close contact with the substrate, in which the deposition film becomes damaged or peeling charge occurs at the time when the mask is removed from the substrate. Discharge of static electricity caused by the charge presents problems of occurrence of element breakdown, drift in threshold value, deterioration in reliability of active elements, and so on.

To solve the above problems, there is a proposal that a partition (hereinafter, referred to as a "projection") being a spacer is provided around the pixel for each pixel to prevent the mask from being in contact with the substrate at the time of deposition (see, for example, JP H08-227276A).

However, because of a small distance between the pixel and the projection, there is a great danger that the electric charges generated by peeling charge at the time of peeling the mask are discharged to the active elements formed in the pixel portion, which discharge may cause damages to the active elements such as breakdown, shift in threshold voltage, deterioration in reliability and so on.

SUMMARY OF THE INVENTION

The present invention has been developed to solve the above problems in manufacturing the liquid crystal panel, and its object is to prevent elements from being damaged by peeling charge and its generated electric charges, in particular, in manufacturing a liquid crystal panel in which a deposition alignment film is formed.

To attain the above object, a method of manufacturing a liquid crystal panel according to the invention includes:

a projection formation step of forming a plurality of projections on one of a pair of substrates in a manner to surround a display area;

after the projection formation step, a mask placement step of placing a mask for shielding the outside of the display area such that the mask is in contact with the projections;

a deposition step of depositing a deposition film within the display area with the mask being placed;

a step of removing the mask;

a sealing material placement step of placing a sealing material in a region where the projections are formed; and an opposed substrate placement step of placing another substrate of the pair of substrates opposed to the one substrate having the projections formed thereon.

In the method of manufacturing a liquid crystal panel, it is desirable to implement any of or a combination of the followings.

The projections are formed such that the height thereof is greater than the thickness of the deposition film.

The deposition film is an alignment film for aligning liquid crystal molecules.

The method further includes a metal film placement step of placing a metal film on the surface of the projections.

The metal film is formed simultaneously with a metal film placed within the display area being an inside area of the region where the sealing material is placed.

The metal film placed within the display area is a pixel electrode relating to display within the display area, and the metal film placed on the surface of the projections and the metal film placed within the display area are placed electrically insulated from each other.

The metal film placed on the surface of the projections is provided to pass through the region where the sealing material is placed and extend to the outside of the display area surrounded by the sealing material.

The substrate having the deposition film placed thereon is an integrated substrate to form substrates of a number of liquid crystal panels.

In this case, the metal films placed on the surfaces of the projections on the number of liquid crystal panels are electrically connected to each other outside the display areas of the number of liquid crystal panels.

The metal film placed on the surface of the projections is electrically connected to a metal line other than the pixel electrode or to the substrate.

The metal film placed on the surface of the projections is placed to protrude from the region where the sealing material is placed to the display area side.

The projections have a function of defining the layer thickness of a liquid crystal layer.

The projections are formed to have a height from 0.9 μm to 2 μm.

The metal film placed on the surface of the projections on the one substrate is brought into contact with an electrode provided on the other substrate, and electrically connected to a wire provided outside the display area on the one substrate.

The projections are provided on both of the pair of substrates, and the projections provided on the substrates are placed at different positions planarly.

An inclined portion inclined such that the thickness decreases toward an edge portion thereof is formed at the outer peripheral portion of deposition film.

The inclined portion is provided to correspond to the region where the sealing material is placed.

A plurality of the projections are placed along the inner periphery of the region on the substrate where the sealing material is placed such that the distribution of the projections on the inside of a center line in the width direction of the sealing material is denser than the distribution on the outside.

An insulating film is provided within the display area on the one substrate and formed with an opening where the insulating film is not provided on the projections.

The substrate provided with the projections is a silicon substrate.

At least one of the pair of substrates has a plurality of the display areas, and the method further includes after the opposed substrate placement step, a substrate cutting step of cutting the substrates for each of the display areas to obtain a plurality of liquid crystal panels.

According to the invention, the projections are formed on the substrate to allow the substrate and the mask to be placed with a predetermined gap intervening therebetween, and the metal film covers the surface of the projections to cause the generated electric charges to easily escape, so that charge at the time of peeling the deposition mask and the discharge of the generated electric charges to the pixel portion can be significantly reduced. This can prevent breakdown of the active elements in the pixel portion, occurrence of display abnormality due to a shift in threshold value of the active elements, and decrease in reliability.

Further, the adhesion between the mask and the substrate can be adjusted by adjusting the number of the projections, thereby facilitating the alignment between the mask and the substrate.

Furthermore, the gap of the liquid crystal layer with a narrow gap can be accurately defined at a low cost.

The electrodes of the liquid crystal substrates can be easily connected.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the invention will be described with reference to the drawings.

Figure 1:
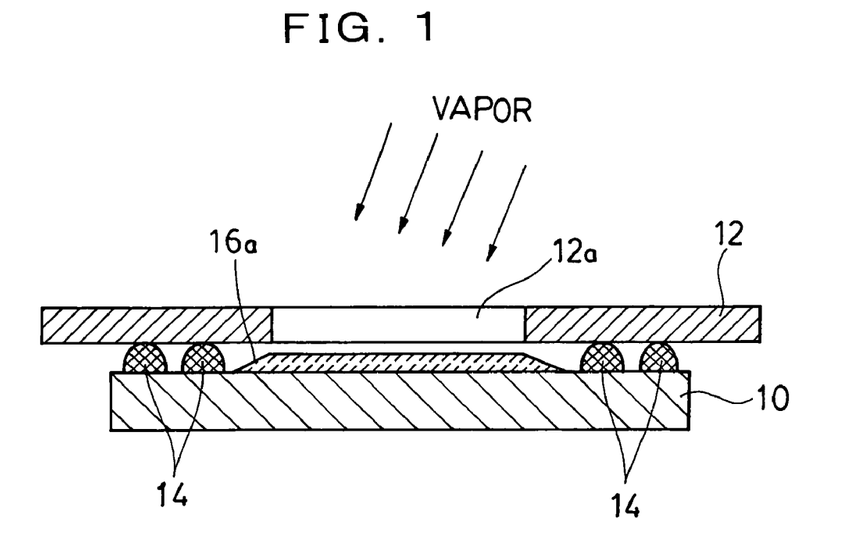
FIG. 1 is a cross-sectional view illustrating a method of forming an alignment film made by deposition.

FIG. 1 is a cross-sectional view illustrating a method of forming an alignment film made by vapor deposition.

In FIG. 1, numeral 10 denotes one of a pair of substrates constituting a liquid crystal panel, which is a substrate made of silicon (Si), on which a number of active elements are integrated in a pixel portion. On the substrate 10, a plurality of projections 14 are formed to serve as spacers between a mask 12 for deposition and the substrate 10. The mask 12 is formed with an opening portion 12a so that, for example, $SiO_2$ is obliquely deposited through the opening portion 12a to form a deposition film 16. The deposition film 16 is formed by the oblique deposition as described above, whereby an inclined portion 16a inclined such that the thickness decreases toward the edge portion thereof is formed at the outer peripheral portion of the deposition film 16.

Note that the same numbers are given to the same components in the following drawings.

Figure 2:
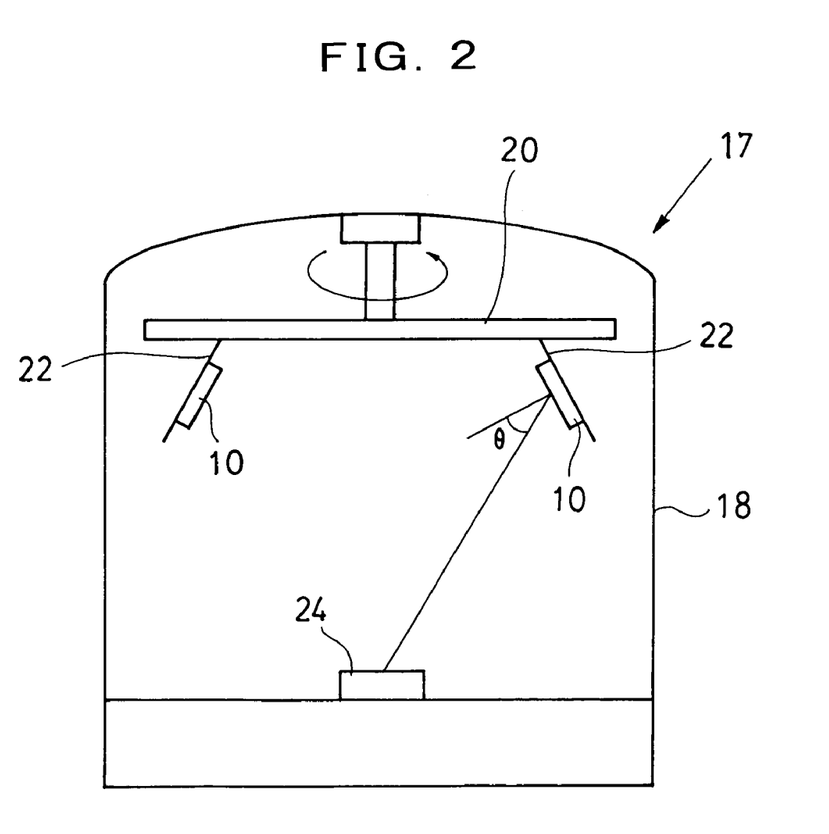
FIG. 2 is a schematic cross-sectional view illustrating a deposition apparatus.

FIG. 2 is a schematic cross-sectional view illustrating a deposition apparatus.

In FIG. 2, a rotary jig 20 is provided in a vacuum container 18 of the deposition apparatus 17, a jig 22 to which a sample is to be attached is obliquely attached to the jig 20, and the substrate 10 is attached to the jig 22. A target 24 is, for example, $SiO_2$ which is heated to evaporate and deposited on the substrate 10 being a sample so as to form a deposition alignment film. This target is $SiO_2$, whose oxygen partly scatters at the time of deposition so that the composition of the deposition alignment film becomes $SiO_X$. In general, $_X$ is on the order of 1.8.

Figure 3:
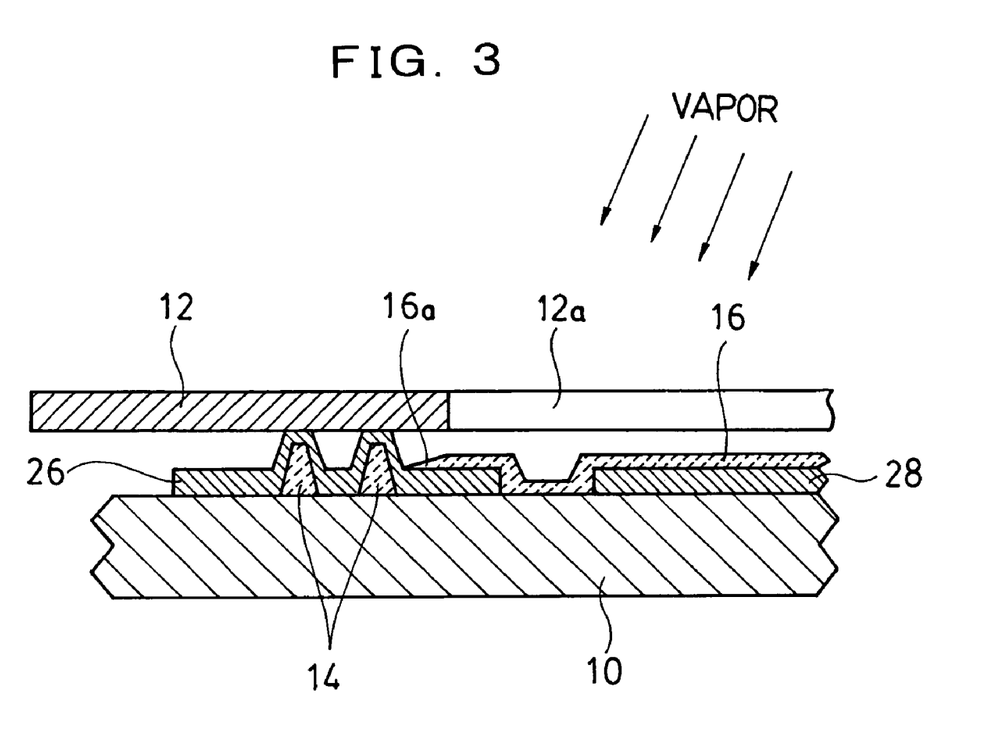
FIG. 3 is a cross-sectional view of an essential portion for explaining an example of projections of a liquid crystal panel manufactured by a manufacturing method of the invention.

FIG. 3 is a cross-sectional view of an essential portion for explaining an example of the projections of the liquid crystal panel manufactured by the manufacturing method of the invention.

In FIG. 3, on the surface of the projections 14 formed of an insulating material, for example, $SiO_2$ or the like, a metal film 26 is placed. The metal film 26 is generally formed using aluminum (Al) or aluminum (Al) containing several percents of copper (Cu) or the like and is preferably made about 1500 Å in thickness.

The above configuration makes it possible to significantly reduce charge due to the mask 12 made of a metal material rubbing against the projections being an insulating material and peeling charge at the time of peeling the mask 12 from the substrate 10, in addition to prevention of damage to the deposition film at the time of separating the mask 12 from the substrate 10.

Here, various examples of the liquid crystal panel manufactured by the manufacturing method of the invention will be presented and described.

First Example of Liquid Crystal Panel

Figure 4:
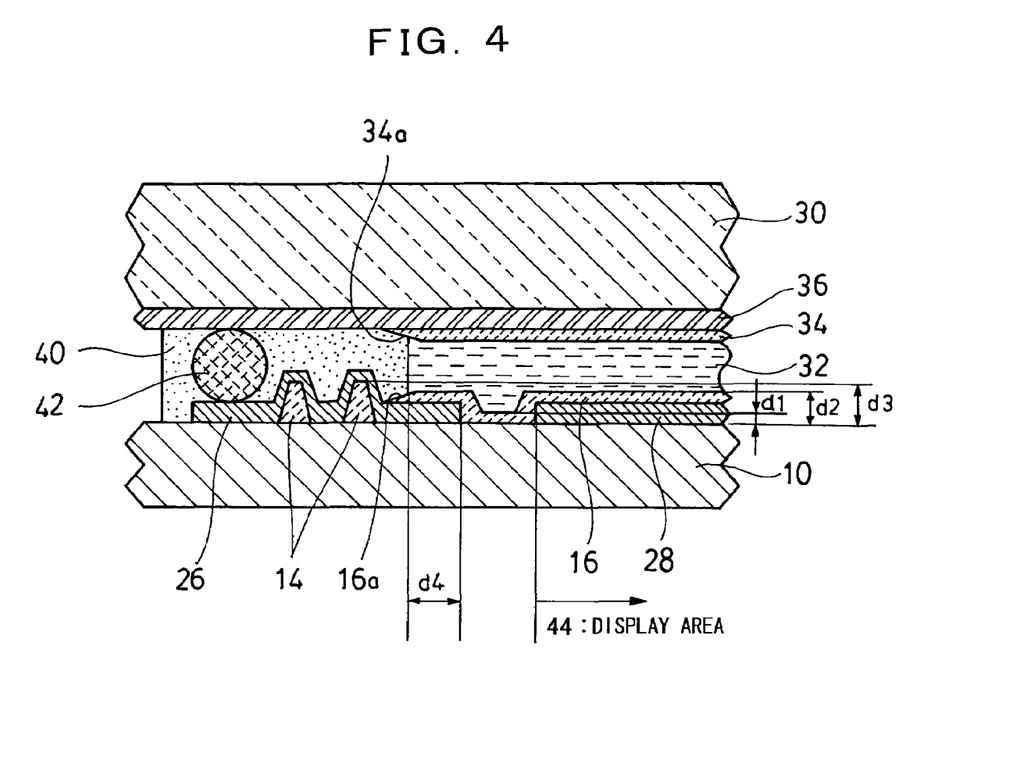
FIG. 4 is a cross-sectional view of an essential portion for explaining the first example of the liquid crystal panel manufactured by the manufacturing method of the invention.

FIG. 4 is a cross-sectional view of an essential portion for explaining the first example of the liquid crystal panel manufactured by the manufacturing method of the invention.

In FIG. 4, a pair of opposed substrates 10 and 30 are bonded together facing each other with a sealing material 40 intervening therebetween, and a liquid crystal layer 32 is sandwiched between the opposed substrates 10 and 30. The substrate 10 is a substrate made of silicon, and the substrate 30 is a transparent substrate made of glass or the like. Thus, the liquid crystal panel shown in FIG. 4 is a reflection-type display panel which performs display by reflecting light from the substrate 30 side.

In this liquid crystal panel, deposition films 16 and 34 are formed on both of the substrates 10 and 30, respectively, the deposition films 16 and 34 are alignment films for aligning liquid crystal molecules in the liquid crystal layer 32. Further, a plurality of projections 14 are provided in a region where the sealing material 40 is placed on the one substrate 10. A transparent electrode 36 is formed on the liquid crystal layer 32 side of the other substrate 30.

Further, a spacer 42 is provided in a region where the sealing material 40 is placed to define the magnitude of the gap between the substrates 10 and 30, that is, the layer thickness of the liquid crystal layer 32.

A metal film 26 is provided on the surface of the projections 14 and a metal film 28 being a pixel electrode is provided in a pixel portion. The metal films 26 and 28, when made of the same kind of material, have effects in a later-described manufacturing process. In general, a plurality of metal films and conductive films for constituting active elements are formed in the pixel portion, and the metal film 28 shows the uppermost metal film of those films.

Further, the metal film 28 placed within a display area 44 and the metal film 26 placed on the surface of the projections 14 are electrically insulated from each other.

This configuration ensures that even if electric charges due to charge such as little peeling charge or the like are generated between the mask 12 shown in FIG. 3 and the metal film 26 covering the projections 14, the electric charges never cause damage to the active elements in the pixel portion.

A height d3 of the projection 14 is set to be greater than a thicknesses d1 of the deposition film 16 and than a thickness d2 formed of the deposition film 16 with the metal film 28 in the pixel portion. This setting ensured that when the mask 12 is brought into contact with the top of the substrate 10 as shown in FIG. 3, the mask 12 is placed on the metal film 26 on the projections 14, with a distance maintained between the mask 12 and the substrate 10. Therefore, it is possible to reduce a risk of damaging the surface of the substrate 10 at the time when the mask 12 is peeled after deposition of the deposition film 16.

Further, the metal film 26 placed on the surface of the projections 14 is placed to protrude from the region where the sealing material 40 is placed to the display area 44 side by a dimension d4 illustrated. This configuration ensures that even if the mask 12 shown in FIG. 3 is charged and the generated electric charges are discharged to the substrate 10 side, the discharge can occur not to the metal film 28 in the pixel portion but to the metal film 26 placed on the surface of the projections 14 so as to prevent the discharge from damaging the active elements in the pixel portion.

The reason why the discharge to the active elements in the pixel portion can be prevented as described above is that the projections are provided in the region where the sealing material 40 is placed rather than that the projections being spacers are provided around pixels for each of pixels as the proposal in the aforementioned Patent Document 1. Because of such a configuration, the distance between the projections and the pixel portion can be made large to significantly reduce the effect of the peeling charge exerted on the pixel.

Figure 5:
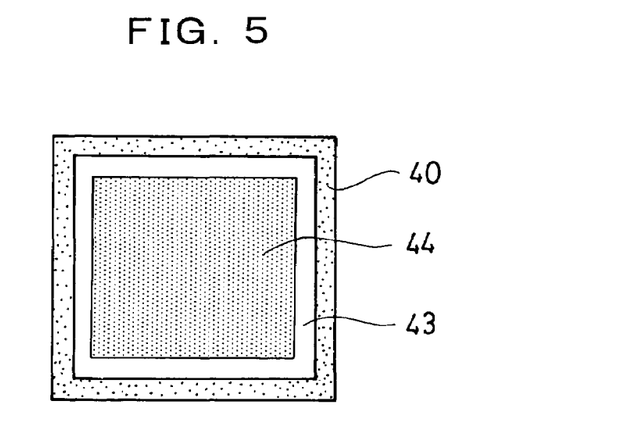
FIG. 5 is a plan view of one liquid crystal panel on a substrate shown in FIG. 4.

FIG. 5 is a plan view of one liquid crystal panel on the substrate 10 being a silicon substrate. The sealing material 40 shown in FIG. 4 surrounds four sides of the one liquid crystal panel, and the display area 44 where the active elements in the pixel portion are to be formed is provided inside the sealing material 40. It is generally required to keep about 1 mm as a gap 43 between the display area 44 and the sealing material 40, so that this distance can make a large distance between the projections and the pixel portion to significantly reduce the effect of the peeling charge.

Further, inclined portions 16a and 34a inclined such that the thicknesses decrease toward their edge portions are formed at the outer peripheral portions of the deposition films 16 and 34, and the inclined portions 16a and 34a are provided in a manner to correspond to the region where the sealing material 40 is placed. More specifically, the inclined portions 16a and 34a are in contact with the sealing material 40 in FIG. 4, but may be located on the display area 44 side outside the sealing material 40. Alternatively, the inclined portions 16a and 34a may be located inside the sealing material 40. In other words, the inclined portions 16a and 34a are placed at the periphery including the sealing material 40 shown in FIG. 5.

The deposition films 16 and 34 have a thickness as small as about 30 nm to about 100 nm, in which if they have vertical outer peripheral portions without inclined portions, the sealing material is blocked by the vertical outer peripheral portions, so that the edge of the sealing material on the liquid crystal side becomes irregular. In another case, the spacers collect together around the vertical outer peripheral portions and they may collect to a part of the portions, resulting in poor uniformity in the cell gap (thickness of the liquid crystal). Further, at the time of injecting the liquid crystal, the liquid crystal flows against the vertical portions of the deposition films to decrease in the injection speed. Therefore, the deposition films 16 and 34 are provided with the inclined portions 16a and 34a respectively so as to increase the injection speed.

This is because, at the portion of the sealing material for injecting the liquid crystal, the liquid crystal is injected into the area with no deposition film, the area with the inclined portions, and then the portion with the deposition films.

This example offers many effects such as a little possibility of causing flaw on the substrate surface constituting the liquid crystal panel, easy alignment of the mask, reduced peeling charge, and prevention of damage to the active elements in the pixel portion even when discharge of generated electric charges occurs.

Second Example of Liquid Crystal Panel

Figure 6:
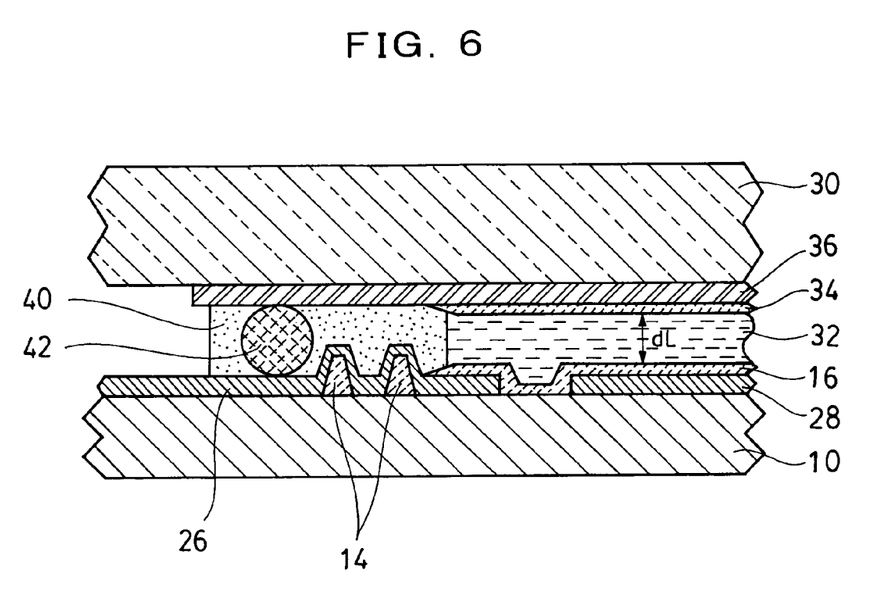
FIG. 6 is a cross-sectional view of an essential portion for explaining the second example of the liquid crystal panel manufactured by the manufacturing method of the invention.

FIG. 6 is a cross-sectional view of an essential portion for explaining the second example of the liquid crystal panel manufactured by the manufacturing method of the invention.

This configuration in FIG. 6 is different from the configuration shown in FIG. 4 of the above-described first example only in that the metal film 26 placed on the surface of the projections 14 passes through the region where the sealing paternal 40 is placed and extends to the outside of the area of one liquid crystal panel (see FIG. 5) surrounded by the sealing material 40.

This configuration makes it possible that when many substrates of liquid crystal panels are formed on an integrated substrate, the metal films 26 placed on the surface of the projections 14 of the liquid crystal panels can be connected each other, so that the capacity of the metal films 26 placed on the surface of the projections 14 increases to enhance the absorbing ability at the time of occurrence of discharge from the mask 12.

Note that dL in FIG. 6 denotes a layer thickness of the liquid crystal layer 32 defined by the spacer 42.

Third Example of Liquid Crystal Panel

Figure 7:
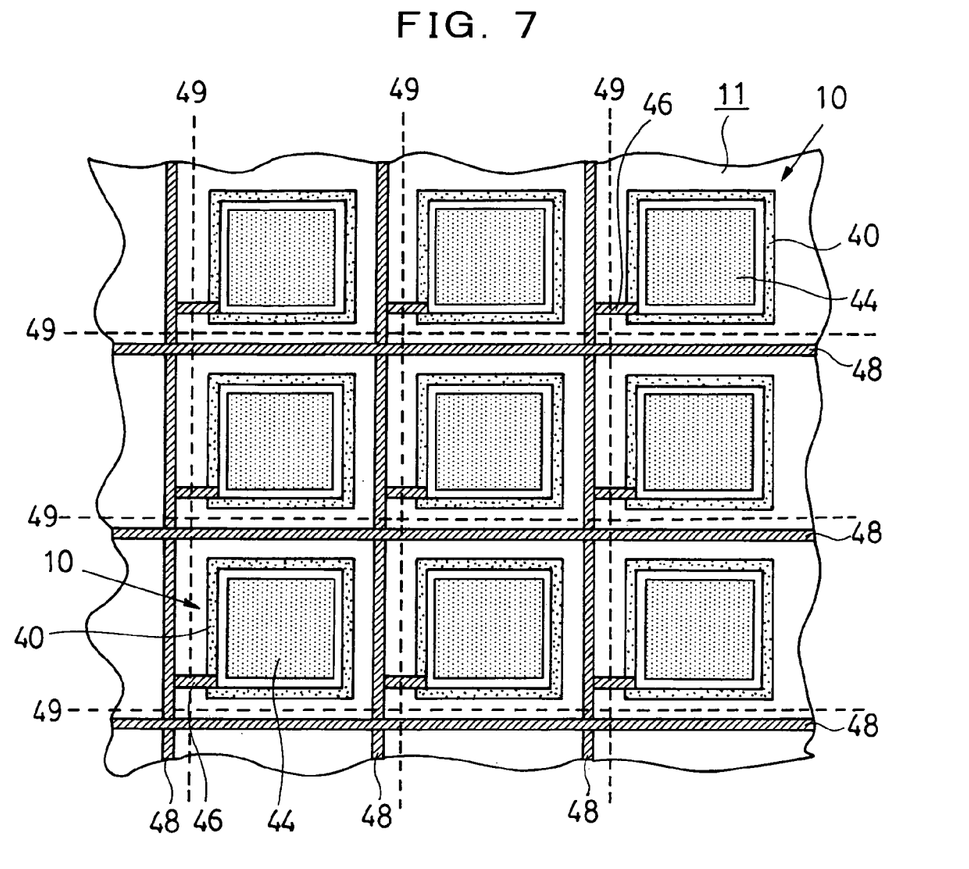
FIG. 7 is a plan view of an integrated substrate for explaining the third example of the liquid crystal panel manufactured by the manufacturing method of the invention.

FIG. 7 is a plan view of the integrated substrate for explaining the third example of the liquid crystal panel manufactured by the manufacturing method of the invention.

FIG. 7 shows a view of a number of substrates 10 of the liquid crystal panels each having the sealing member 40 and the display area 44 formed on an integrated substrate 11, in which the metal film 26 placed on the surface of the projections 14 extending to the outside of the sealing material 40 in FIG. 6 corresponds to a wire 46. The wires 46 of the substrates 10 of a plurality of liquid crystal panels are electrically connected to each other by connecting to wires 48 provided in an area outside the display areas surrounded by the respective sealing materials 40.

This configuration makes it possible that when many substrates for liquid crystal panels are formed on the integrated substrate, the metal films 26 placed on the surface of the projections 14 provided on the substrates of the liquid crystal panels can be connected each other, so that the capacity of the metal films 26 placed on the surface of the projections 14 increases to enhance the absorbing ability at the time of occurrence of discharge from the mask 12 and further reduces the damage.

After undergoing a process of manufacturing components such as the wires 46, the integrated substrate can be cut, for example, along illustrated cutting lines 49 and separated into individual substrates for liquid crystal panels.

Fourth Example of Liquid Crystal Panel

Figure 8:
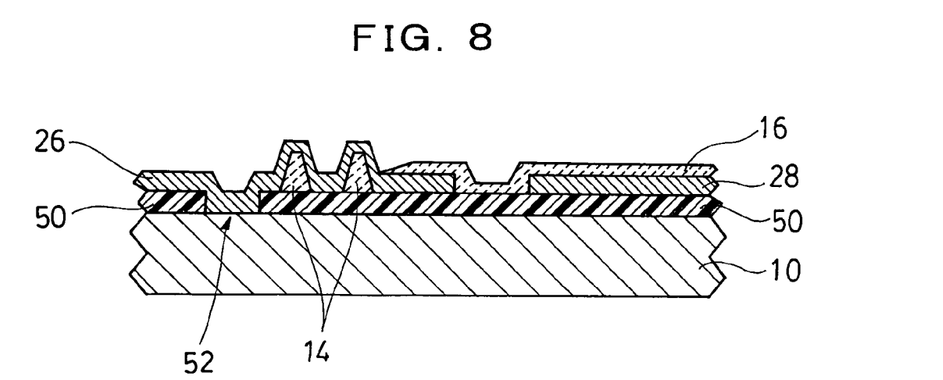
FIG. 8 is a cross-sectional view of an essential portion for explaining the fourth example of the liquid crystal panel manufactured by the manufacturing method of the invention.

FIG. 8 is a cross-sectional view of an essential portion for explaining the fourth example of the liquid crystal panel manufactured by the manufacturing method of the invention.

The substrate 10 and layers on its surface in FIG. 8 are different from those shown in FIG. 4 and FIG. 6 in that an insulating film 50 is provided on the surface of the substrate 10 and that the insulating film 50 is provided with a contact portion 52 where the insulating film 50 is opened, through which the metal film 26 placed on the surface of the projections 14 is brought into contact with the substrate 10 being a silicon substrate for electrical connection.

This configuration makes it possible to increase the capacity of the metal film 26 placed on the surface of the projections 14 so as to enhance the absorbing ability at the time of occurrence of discharge from the mask 12 and reduce the damage. Those effects are the same as those in the examples explained with reference to FIG. 4 and FIG. 6.

Further, if the jig to which the silicon substrate is to be attached is made of a conductor and grounded at the time of depositing the deposition film 16, the metal film 26 placed on the surface of the projections 14 is grounded through the silicon substrate 10, thereby ensuring that discharge from the mask 12 can be performed more surely to the metal film 26 placed on the surface of the projections 14 to protect the active elements in the pixel portion.

Also, the use of the means in the fourth example together with the means in the second and third examples leads to further reduction in a ground resistance of the metal film 26, thereby further increasing the effects.

Fifth Example of Liquid Crystal Panel

Figure 9:
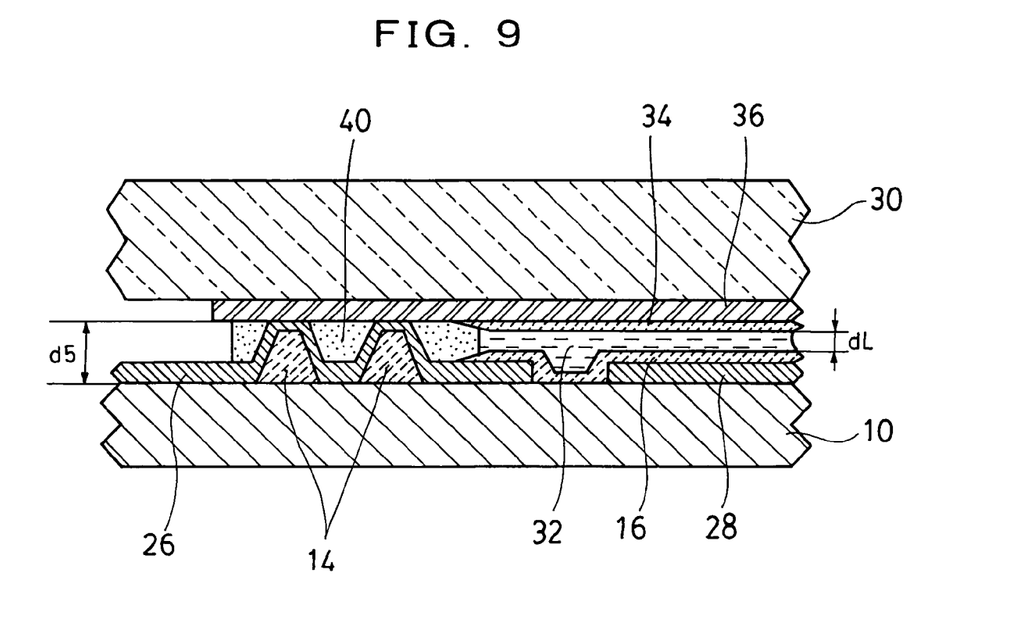
FIG. 9 is a cross-sectional view of an essential portion for explaining the fifth example of the liquid crystal panel manufactured by the manufacturing method of the invention.

FIG. 9 is a cross-sectional view of an essential portion for explaining the fifth example of the liquid crystal panel manufactured by the manufacturing method of the invention.

FIG. 9 is different from FIG. 4 in that the spacer 42 in FIG. 4 is omitted and the projections 14 have a function of defining a layer thickness dL of the liquid crystal layer.

The projections 14 can be precisely produced in the manufacturing process of producing the active elements on the substrate, thereby presenting an advantage of better accuracy in defining the layer thickness than by the spacer which is applied to define the layer thickness of the liquid crystal layer 32. However, there is a problem of a difficulty in producing projections greater in height. Therefore, this configuration is effective when the layer thickness dL of the liquid crystal layer 32 is made very small in order to increase the response speed of the liquid crystal. The height d5 of the projections 14 defining the layer thickness of the liquid crystal layer 32 preferably falls within 0.9 µm to 2 µm, and more preferably within 1.0 µm to 1.5 µm.

Since the thickness of the metal film 26 placed on the surface of the projections 14 is generally on the order of 1500 Å, the layer thickness dL of the liquid crystal layer 32 is mainly defined by the projections 14.

Furthermore, this configuration makes it possible to bring the metal film 26 placed on the surface of the projections 14 provided on the one substrate 10 into contact with the electrode 36 provided on the other substrate 30.

In general, the electrode 36 provided on the other substrate 30 is an integrated electrode over the entire surface to realize a so-called vertical electrode transition in which a silver point is located in the region of the sealing material 40 to electrically connect the electrode on the substrate 30 to the electrode on the substrate 10, thereby enabling an input terminal for signals from the outside to be provided only on the one substrates 10 for simplification of the structure and reduction in cost.

According to the fifth example, the metal film 26 placed on the surface of the projections 14 kept electrically connected to the wire provided outside the sealing material 40 to allow the signals from the outside to be applied to the electrode 36 provided on the other substrate 30 via the wire and the metal film 26. Therefore, a process of placing the silver point can be omitted for further simplification of the structure and reduction in cost.

Although the metal film 26 is placed on the projections 14 in this example, the function of accurately defining the layer thickness of the liquid crystal layer 32 can be realized by the projections 14 without placing the metal film 26 as a matter of course.

Sixth Example of Liquid Crystal Panel

Figure 10:
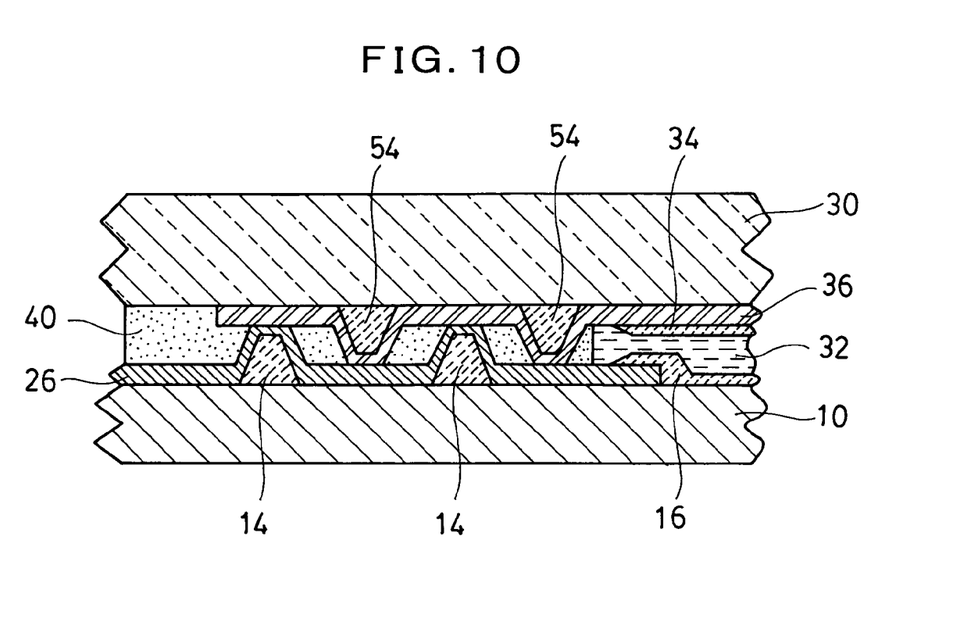
FIG. 10 is a cross-sectional view of an essential portion for explaining the sixth example of the liquid crystal panel manufactured by the manufacturing method of the invention.
Figure 11:
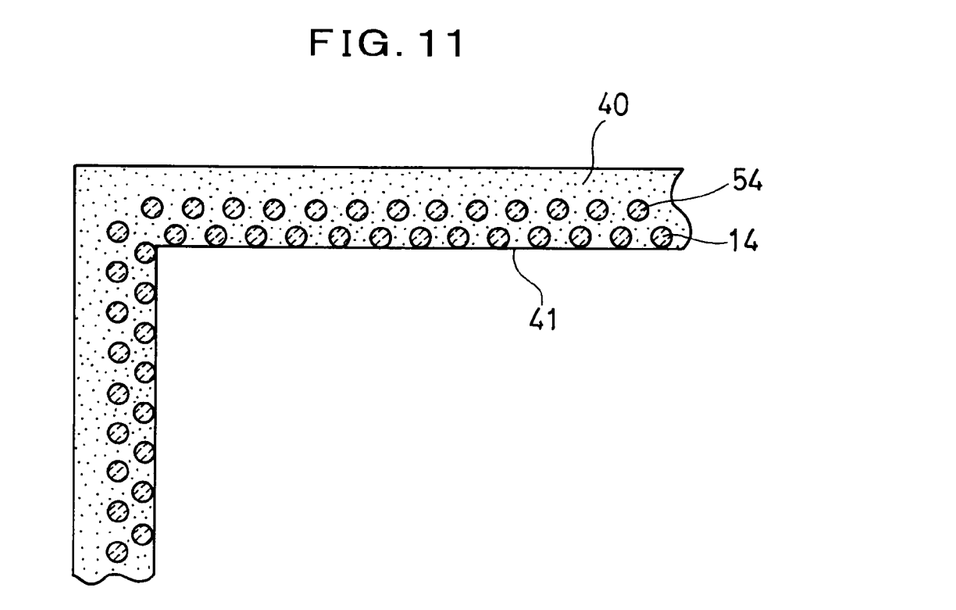
FIG. 11 is a partial plan view showing the projections and a sealing material on the substrate.

FIG. 10 is a view of an essential portion for explaining the sixth example of the liquid crystal panel manufactured by the manufacturing method of the invention, and FIG. 11 is a partial plan view showing the projections and the sealing material on its substrate.

In this example, in addition to the projections 14 on the one substrate 10, projections 54 are also provided on the other substrate 30 as shown in FIG. 10. As viewed in the cross section shown in FIG. 10, the projections 14 and the projections 54 are alternately located and arranged not to overlap with each other. As viewed in a plane from above or below the figure in FIG. 10, as shown in FIG. 11, the respective projections 14 and 54 are arranged at different positions in the plane such that, for example, the projections 14 on the one substrate 10 are located in the first line from an inner periphery 41 of the sealing material 40 and the projections 54 on the other substrate 30 are located in the second line from the inner periphery 41 of the sealing material 40.

The provision of the projections 54 also on the substrate 30 as described above can reduce the possibility of causing flaw on the surface of the substrate 30 at the time of forming the deposition film 34 on the substrate 30.

Seventh Example of Liquid Crystal Panel

Figure 12:
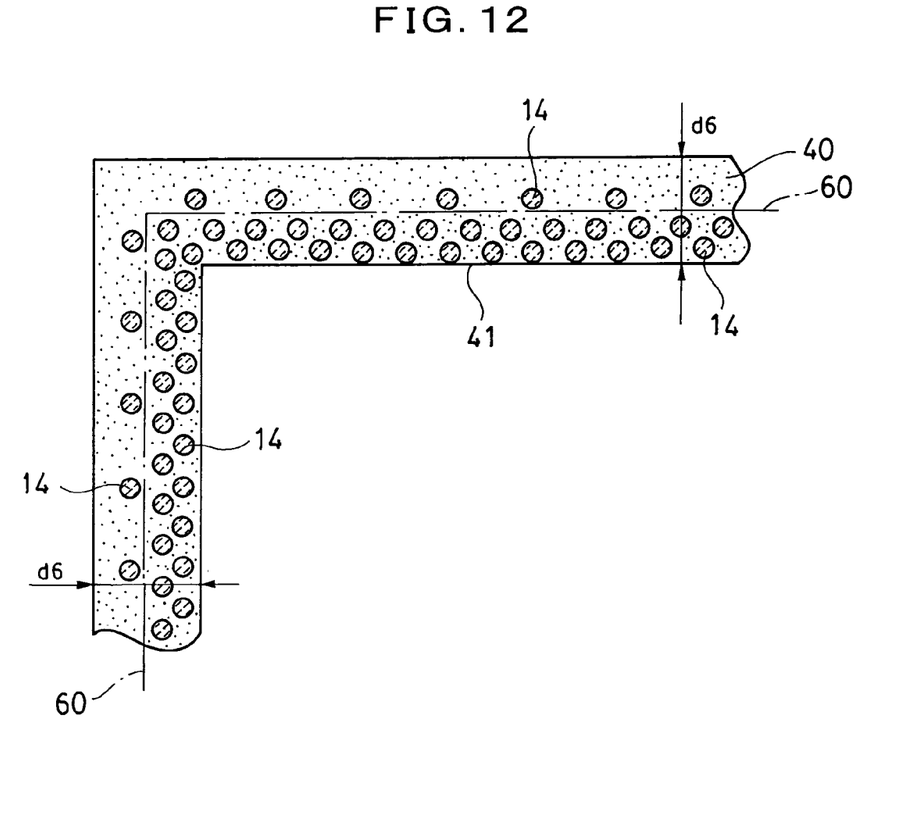
FIG. 12 is a partial plan view showing the projections and the sealing material on the substrate in the seventh example of the liquid crystal panel manufactured by the manufacturing method of the invention.

FIG. 12 is a plan view, similar to FIG. 11, showing the projections and the sealing material on the substrate in the seventh example of the liquid crystal panel manufactured by the manufacturing method of the invention.

The projections 14 in this example are arranged in a plurality of lines in two dimensions along the inner periphery 41 of the region on the substrate where the sealing material 40 is placed, and the distribution of the projections 14 on the inside of a center line 60 in a width direction of the sealing material 40 is denser than that on the outside.

The provision of the projections 14 in a plurality of lines in the sealing material 40 as described above can increase the area where the sealing material 40 is in close contact with the substrates 10 and 30 to enhance the strength of close contact.

Furthermore, the distribution of the projections 14 on the inside of the center line 60 in the width direction of the sealing material 40 made denser than that on the outside hardly causes irregularities due to the projections 14 on the outside of the sealing material 40 which is exposed to an environmental atmosphere, thereby not causing hindrance of the inherent function of the sealing material 40 of preventing from entering of water.

Eighth Example of Liquid Crystal Panel

Figure 13:
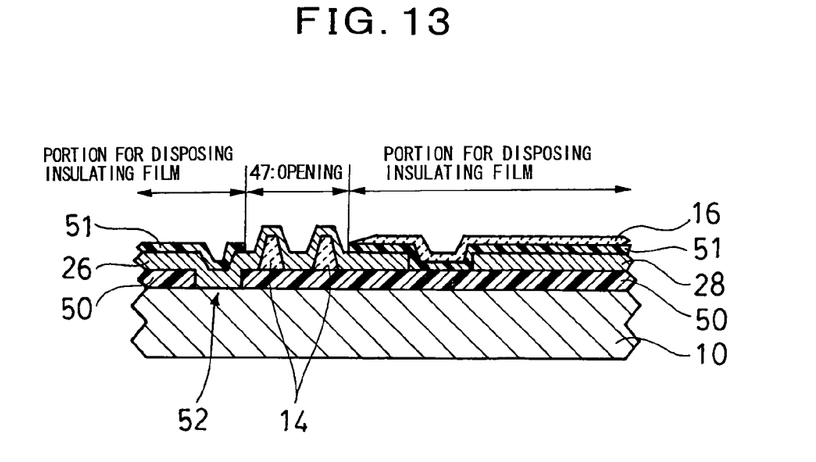
FIG. 13 is a cross-sectional view of an essential portion for explaining the eighth example of the liquid crystal panel manufactured by the manufacturing method of the invention.

FIG. 13 is a cross-sectional view of an essential portion for explaining the eighth example of the liquid crystal panel manufactured by the manufacturing method of the invention.

The example shown in FIG. 13 is different from the example shown in FIG. 8 in that an insulating film 51 is provided between the electrode 28 and the deposition film 16 of the pixel portion.

Although the insulating film is generally formed on the electrode 28 of the pixel portion to prevent electrical short circuit between the electrodes on the upper and lower substrates 10 and 30 due to conductive foreign substance in the liquid crystal layer, an opening 47 is formed in the insulating film 51 so as not to place the insulating film 51 on the projections 14 in this example.

This configuration can bring the metal film 26 placed on the surface of the projections 14 into contact with the electrode 36 provided on the other substrate 30.

Embodiment of Method of Manufacturing Liquid Crystal Panel

Hereinafter, embodiments of the method of manufacturing the liquid crystal panel according to the invention to manufacture the liquid crystal panels in the above described examples will be described.

Figure 14A:
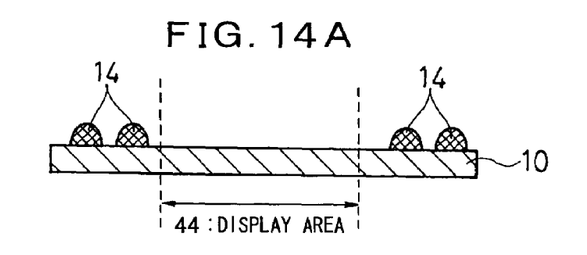
FIG. 14A to FIG. 14E are cross-sectional views showing processes of the method of manufacturing the liquid crystal panel according to the invention.
Figure 14B:
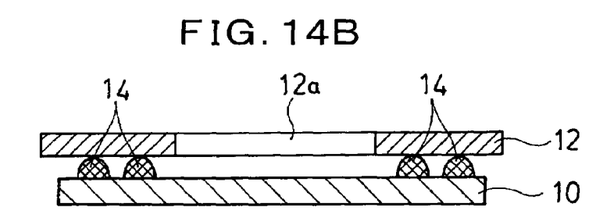
Figure 14C:
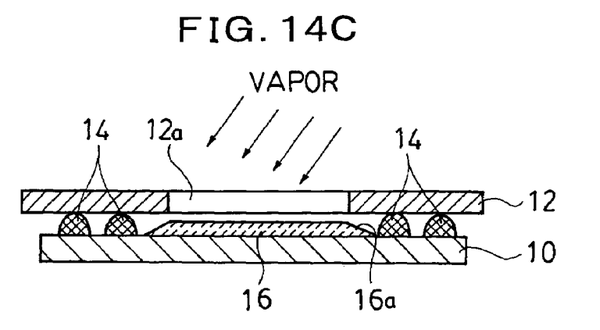
Figure 14D:
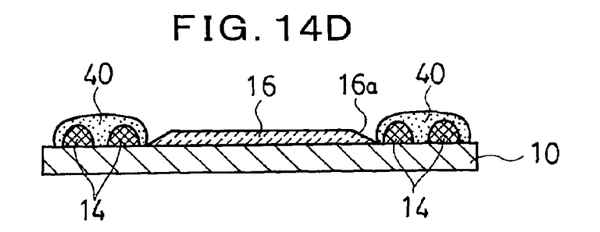
Figure 14E:
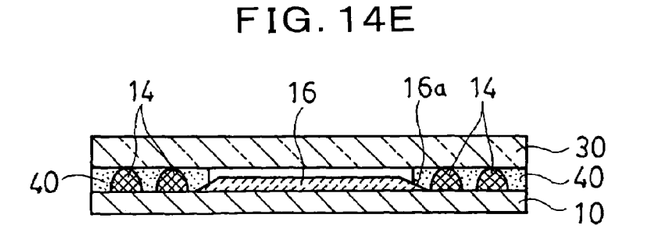
Figure 15:
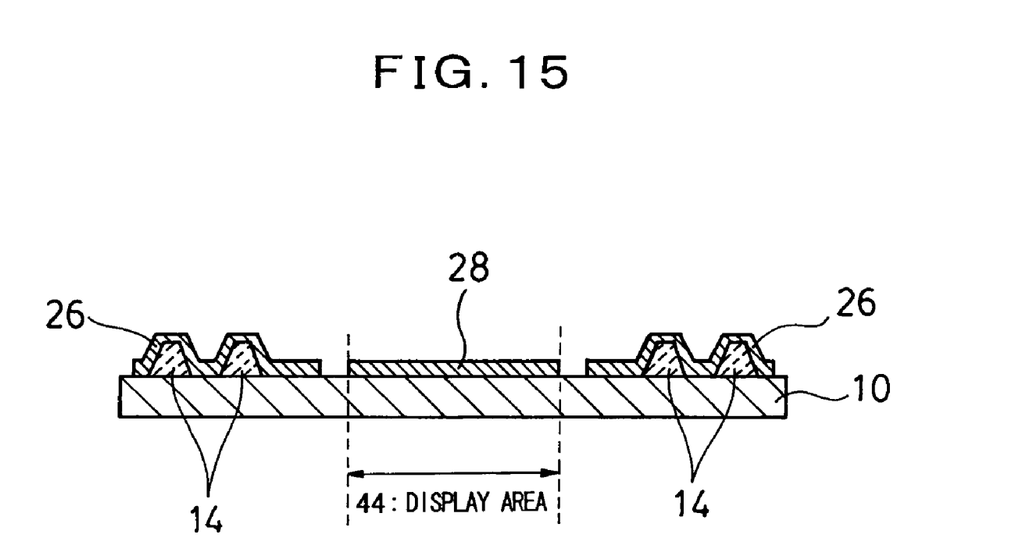
FIG. 15 is a cross-sectional view showing a metal film placement process in the liquid crystal panel manufacturing method according to the invention.

FIG. 14A to FIG. 14E are cross-sectional views showing processes of the method of manufacturing the liquid crystal panel according to the invention, and FIG. 15 is a cross-sectional view showing a metal film placement process of the processes. In the drawings, the same numbers are given to the same members corresponding to those in the drawings described thus far. The illustration of the projections forming no sections in the drawings is omitted.

Figure 16A:
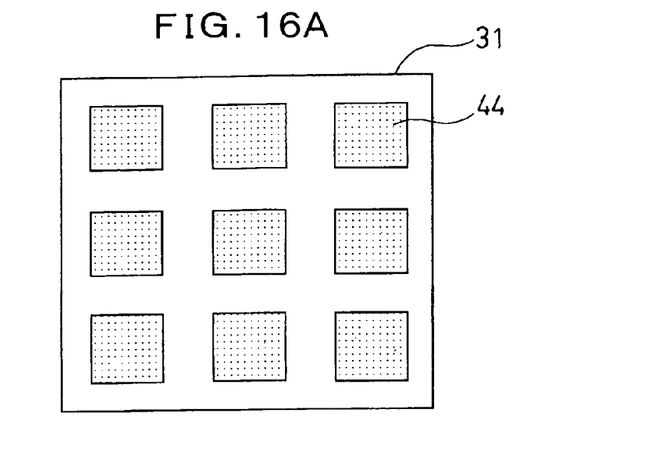
FIG. 16A to FIG. 16C are plan views for explaining a substrate cutting process in the liquid crystal panel manufacturing method according to the invention.
Figure 16B:
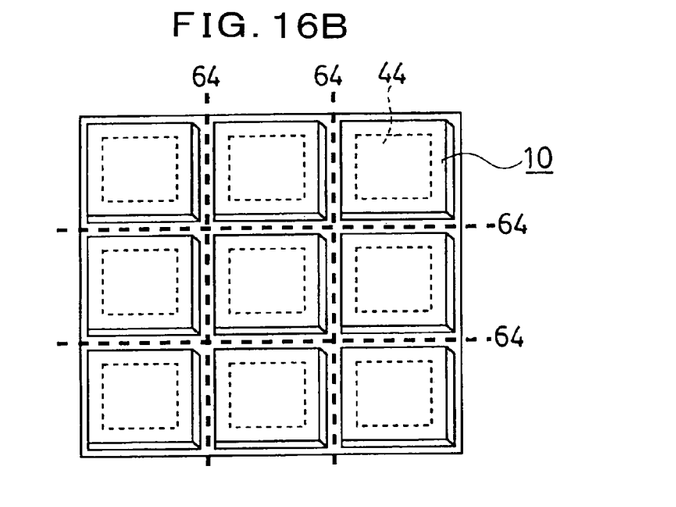
Figure 16C:
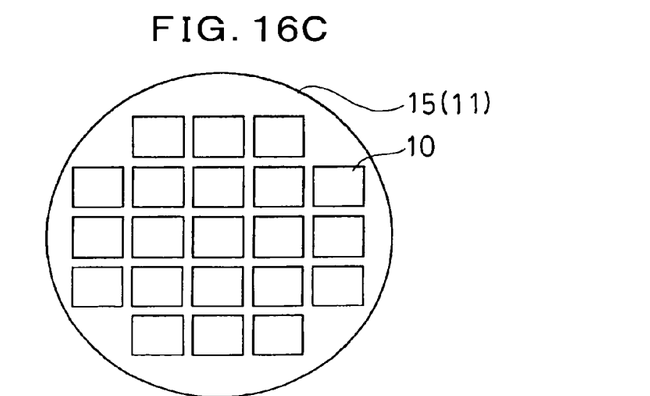

FIG. 16A to FIG. 16C are plan views showing a substrate cutting process in the liquid crystal panel manufacturing method according to the invention.

In FIG. 14A to FIG. 14E, FIG. 14A is a view illustrating a projection formation process in which a plurality of projections 14 are formed on the substrate 10 (silicon substrate) being one of a pair of substrates constituting the liquid crystal panel in a manner to surround the area to be the display area 44 of the liquid crystal panel.

The projections 14 are formed of an insulating material, for example, $SiO_2$, a resist, a photosensitive polyimide or the like on the substrate 10 by the photolithography method or the like.

It is desirable to make the height of the projections 14 greater than the film thickness of the deposition film 16 formed in a later-described deposition process. In this case, the projection is preferably formed to have a height from 0.9 μm to 2 μm, and more preferably in a range from 1.0 μm to 1.5 μm.

FIG. 14B is a view illustrating a mask placement process in which the mask 12 having the opening portion 12a corresponding to the area which will be the display area 44 is placed on the substrate 10 in a manner to be in contact with the projections 14 after the projection formation process. This mask 12 is for shielding the outside of the area which will be the display area 44 on the substrate 10.

FIG. 14C is a view illustrating a deposition process in which the deposition film 16 is obliquely deposited within the area on the substrate 10 which will be the display area 44 through the opening portion 12a in the mask 12 by the deposition apparatus as shown in FIG. 2 after the mask placement process. When using, for example, $SiO_2$ as the target, the deposition film 16 becomes an $SiO_2$ film. The deposition film 16 is an alignment film to align liquid crystal molecules.

The deposition film 16 is formed by the oblique deposition as described above, whereby the inclined portion 16a inclined such that the thickness decreases toward the edge portion thereof can be formed at the outer peripheral portion of the deposition film 16. The inclined portion 16a is preferably provided to correspond to the position on the substrate 10 where the later-described sealing material 40 is placed. However, this is not essential for the invention.

FIG. 14D is a view illustrating a sealing material placement process in which the sealing material 40 is placed at the position on the substrate 10 where the projections 14 are formed, in a manner to surround the area which will be the display area 44 after the deposition process. The sealing material 40 is formed using a material with a sealing property, adhesion property, and insulating property, for example, an acrylic resin which cures with UV light or the like by the screen printing method, the dispenser method or the like.

FIG. 14E is a view illustrating an opposed substrate placement process in which, after the sealing material placement process, the other substrate 30 (transparent substrate made of glass or the like) of the pair of substrates is placed opposite to the substrate 10 having the projections 14 formed thereon, and the pair of the substrates 10 and 30 are bonded together via the sealing material 40 intervening therebetween. Thus, the gap between the substrates 10 and 30, that is, the layer thickness of the liquid crystal layer can be defined by the plurality of projections 14 in the sealing material 40 without using spacers.

With these processes, a liquid crystal panel can be manufactured in which no metal film 26 is placed on the surface of the projections 14 in the above-described examples of the liquid crystal panel.

It should be note that although a process of forming electrodes, many active elements and so on in the pixel portions on the opposed surfaces of the pair of substrates 10 and 30, a process of, after bonding the substrates 10 and 30 together by the opposed substrate placement process, injecting a liquid crystal into a gap formed between the substrates 10 and 30 to form the liquid crystal layer 32 shown in FIG. 4 and so on are necessary as a matter of course, their description is omitted herein because those processes are known to those skilled in the art.

FIG. 15 is a view illustrating a metal film placement process in the liquid crystal panel manufacturing method according to the invention.

In this metal film formation process, the metal film 26 described in FIG. 4 and so on is formed as a coating on the surface of the projections 14 and around them on the substrate 10, and the metal film 28 is formed also within the display area 44 on the substrate 10.

The metal film 26 on the surface of the projections 14 and the metal film 28 within the display area 44 may be individually formed in separate processes, but they can be simultaneously formed in the same process to thereby simplify the processes.

Since the metal film 28 placed within the display area 44 is a pixel electrode relating to display within the display area 44, the metal film 28 is placed, electrically insulated from the metal film 26 placed on the surface of the projections 14.

Further, the metal film 26 placed on the surface of the projections 14 is preferably provided such that the metal film 26 passes through the region where the sealing material 40 is placed and extends to the outside of the display area 44 surrounded by the sealing material 40.

FIG. 16A to FIG. 16C are plan views for explaining the substrate cutting process in the liquid crystal panel manufacturing method according to the invention.

The liquid crystal panel manufacturing method of the invention, in which at least one of the pair of substrates 10 and 30 has a plurality of display areas 44, has a substrate cutting process in which the substrates 10 and 30 are cut for each display area to obtain a plurality of liquid crystal panels, after the above-described opposed substrate placement process.

In the above-described opposed substrate placement process, the pair of substrates 10 and 30 may be placed with a plurality of display areas 44 provided on both of them, or at least one of the substrates may be cut for each display area and then placed opposed to the other substrate as shown in FIG. 14E.

FIG. 16A to FIG. 16C are views illustrating the latter method, and FIG. 16A shows a state where a plurality of display areas 44 are formed on an integrated substrate 31 being a transparent substrates corresponding to the above-described substrates 30. FIG. 16B shows a state where the substrates 10 cut out from the integrated substrate 11 shown in FIG. 7 for each display area 44 are placed over the display areas 44 on the integrated substrate 31 shown in FIG. 16A so that they are placed opposed each other.

The integrated substrate 31 shown in FIG. 16B in which the substrates 10 of the liquid crystal panels are placed on the integrated substrate 31 is cut along cutting lines 64 in the substrate cutting process into cut-out individual liquid crystal panels.

In this embodiment, the non-defective rate is relatively low because many active elements are formed on the substrate 10 which is made of silicon. Hence, cutting-out from the integrated substrate is performed first, and only non-defective products are placed on the display areas on the other transparent integrated substrate and then cut out, thereby presenting the effect of increasing the yield.

Further, a plurality of substrates 10 are generally formed on a circular silicon wafer 15 as shown in FIG. 16C. Since the integrated substrate 11 composed of the silicon wafer 15 is circular and the integrated substrate 31 being the transparent substrate is quadrangular, a large waste area is produced when the integrated substrates 11 and 31 are placed one on the other. For this reason, the substrate placement as shown in FIG. 16B is effective in increasing the yield.

Besides, in the case where the projections 14, the sealing material 40, and the deposition film 16 shown in FIG. 6 are placed on the integrated substrate 11 in a manner to surround the display area 44 of each of the liquid crystal panel to form the substrates 10 of many liquid crystal panels as shown in FIG. 7, the following method is preferable.

The metal films 26 placed on the respective surfaces of the projections 14 on the substrates 10 of many liquid crystal panels are formed to pass through the regions where the sealing materials 40 are placed as described above and extend to the outside the display areas 44 surrounded by the sealing materials 40. The extended portions are then electrically connected to each other outside the display areas 44 in many liquid crystal panels.

Alternatively, the metal films 26 placed on the surfaces of the projections 14 may be electrically connected to metal lines (wires) other than the pixel electrodes or to the substrates 10.

Further, it is desirable that the metal films 26 placed on the surface of the projections 14 are placed to protrude from the regions where the sealing materials 40 are placed to the display areas 44 side.

It is also possible to bring the metal film 26 placed on the surface of the projections 14 on the one substrate 10 into contact with the electrode provided on the other substrate 30, and to electrically connect the metal film 26 to the wire provided outside the display area 44 on the one substrate 10.

Further, it is also possible to provide the projections 14 and 54 on both of the pair of substrates 10 and 30 as shown in FIG. 10 such that the projections 14 and 54 provided on the substrates 10 and 30 are placed at different positions planarly as shown in FIG. 11.

It is preferable to place a plurality of projections 14 along the inner periphery of the area on the substrate 10 where the sealing material 40 is placed such that the distribution of the projections 14 on the inside of the center line in the width direction of the sealing material 40 is denser than the distribution on the outside as shown in FIG. 12.

It is preferable that an insulating film is provided within the display area 44 on the one substrate 10 and formed with an opening where the insulating film is not provided on the projections 14 (see FIG. 13).

What is claimed is:

1. A method of manufacturing a liquid crystal panel comprising:
   a projection formation step of forming a plurality of projections on one of a pair substrates in a manner to surround a display area;
   after said projection formation step, a mask placement step of placing a mask for shielding the outside of the display area such that the mask is in contact with the projections but not in contact with the substrate;
   a deposition step of depositing a deposition film within the display area through the mask;
   a step of removing the mask;
   a sealing material placement step of placing a sealing material in a region where the projections are formed;
   an opposed substrate placement step of placing another substrate of the pair of substrates opposed to the one substrate having the projections formed thereon; and
   a metal film placement step of placing a metal film on the surface of the projections;
   wherein:
   the metal film placed on the surface of the projections is provided to pass through the region where the sealing material is placed and extend to the outside of the display area surrounded by the sealing material;

the substrate having the deposition film placed thereon is an integrated substrate to form substrates of a number of liquid crystal panels; and the metal films placed on the respective surfaces of the projections on the number of liquid crystal panels are electrically connected to each other outside the display areas of the liquid crystal panels.

2. A method of manufacturing a liquid crystal panel comprising:

a projection formation step of forming a plurality of projections on one of a pair of substrates in a manner to surround a display area;

after said projection formation step, a mask placement step of placing a mask for shielding the outside of the display area such that the mask is in contact with the projections but not in contact with the substrate;

a deposition step of depositing a deposition film within the display area through the mask;

a step of removing the mask;

a sealing material placement step of placing a sealing material in a region where the projections are formed;

an opposed substrate placement step of placing another substrate of the pair of substrates opposed to the one substrate having the projections formed thereon; and a metal film placement step of placing a metal film on the surface of the projections;

wherein:

the metal film is formed simultaneously with a metal film placed within the display area being an inside area of the region where the sealing material is placed;

the metal film placed within the display area is a pixel electrode relating to display within the display area, and the metal film placed on the surface of the projections and the metal film placed within the display area are placed electrically insulated from each other; and the metal film placed on the surface of the projections is electrically connected to a metal line other than the pixel electrode or to the substrate.

3. A method of manufacturing a liquid crystal panel comprising:

a projection formation step of forming a plurality of projections on one of a pair of substrates in a manner to surround a display area;

after said projection formation step, a mask placement step of placing a mask for shielding the outside of the display area such that the mask is in contact with the projections but not in contact with the substrate;

a deposition step of depositing a deposition film within the display area through the mask;

a step of removing the mask;

a sealing material placement step of placing a sealing material in a region where the projections are formed;

an opposed substrate placement step of placing another substrate of the pair of substrates opposed to the one substrate having the projections formed thereon; and a step of forming an inclined portion inclined such that the thickness decreases toward an edge portion thereof, at the outer peripheral portion of the deposition film.

4. The method of manufacturing a liquid crystal panel according to claim 3, wherein the inclined portion is provided to correspond to the region where the sealing material is placed.

* * * * *